(12) United States Patent
Haley

(10) Patent No.: US 12,570,195 B2
(45) Date of Patent: Mar. 10, 2026

(54) HEADREST ASSEMBLY WITH ELECTRICAL CHARGING

(71) Applicant: FCA US LLC, Auburn Hills, MI (US)

(72) Inventor: John W Haley, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 170 days.

(21) Appl. No.: 18/526,236

(22) Filed: Dec. 1, 2023

(65) Prior Publication Data

US 2025/0178503 A1 Jun. 5, 2025

(51) Int. Cl.
*B60N 2/809* (2018.01)
*B60N 2/879* (2018.01)

(52) U.S. Cl.
CPC ............. *B60N 2/809* (2018.02); *B60N 2/879* (2018.02)

(58) Field of Classification Search
CPC ................................. B60N 2/809; B60N 2/879
See application file for complete search history.

(56) References Cited

U.S. PATENT DOCUMENTS

| | | | |
|---|---|---|---|
| 2019/0001853 A1* | 1/2019 | Durkee | B60N 2/809 |
| 2021/0086675 A1* | 3/2021 | Tait | |
| 2021/0188141 A1* | 6/2021 | Mizobata | B60N 2/879 |

FOREIGN PATENT DOCUMENTS

DE 102021100670 A1 * 7/2022

OTHER PUBLICATIONS

Meta Quest Pro; https://vr-compare.com/headset/metaquestpro; (1 page).
Xreal Air and Xreal Beam review: impressive AR tech but still not perfect; https://www.techradar.com/reviews/nreal-air-ar-glasses; (1 page).
Kim, Yong Min, et al.; Wearing Comfort and Percevied Heaviness of Smart Glasses; Mar. 3, 2021 (12 pages).
Vuzix; https://www.vuzix.com; 2023 (1 page).
Screenshot for EyeRide Head up Display for Riders; https://www.youtube.com/watch?v=b_8BSqs1xXw; Accessed Nov. 30, 2023.
Screenshot for HoloLens2; https://www.youtube.com/watch?v=XwOnHqiNAeU; Accessed Nov. 30, 2023.
Screenshot for HoloLens2 AR Headset on Stage Live Demonstration; https://www.youtube.com/watch?v=uIHPPtPBgHk; Accessed Nov. 30, 2023.

* cited by examiner

*Primary Examiner* — Anthony D Barfield
(74) *Attorney, Agent, or Firm* — Jeremy J. Klobucar

(57) ABSTRACT

The vehicle headrest assembly includes a body with an exterior and an interior, and a mount by which the body is mountable on a vehicle seat. The vehicle headrest assembly also includes a power cable at least partially within the interior, adapted to communicate with a power supply. The power cable has a transmitter that includes a magnetic connector adapted to be magnetically coupled to a device. The transmitter is adapted to provide electrical energy through the magnetic connector to provide electrical power to a device connected to the magnetic connector. The device may be a wearable electronic device or the like.

16 Claims, 2 Drawing Sheets

HEADREST ASSEMBLY WITH ELECTRICAL CHARGING

FIELD

The present disclosure relates to a vehicle headrest and charging or powering electronic devices.

BACKGROUND

Vehicle headrests are used to limit rearward head movement of a vehicle occupant during a collision, particularly at the rear end of the vehicle. Additionally, wearable electronics traditionally must be charged while removed from the user. This requires wearable electronic devices to have bulky and heavy batteries capable of storing energy to support long duration operation of the wearable electronic device, leading to unappealing and uncomfortable designs to accommodate these batteries.

SUMMARY

In at least some implementations, a vehicle headrest assembly includes a body with an exterior and an interior, and a mount by which the body is mountable on a vehicle seat. The vehicle headrest assembly also includes a power cable at least partially within the interior, adapted to communicate with a power supply. The power cable has a transmitter that includes a magnetic connector adapted to be magnetically coupled to a device. The transmitter is adapted to provide electrical energy through the magnetic connector to provide electrical power to a device connected to the magnetic connector.

In at least some implementations, the mount includes a post by which the body is connectable to a vehicle seat wherein at least part of the power cable is received within the post.

In at least some implementations, a first end of the power cable is accessible from an end of the post and a second end of the power cable is accessible from the exterior and a portion of the power cable between the first end of the power cable and the second end of the power cable is within the interior.

In at least some implementations, the power cable includes a first segment at least partially within the interior of the body and a second segment at least partially outside the interior of the body.

In at least some implementations, the first segment has a first plug and the second segment has a second plug and the first plug and the second plug are removably coupled together to electrically connect the first segment and the second segment.

In at least some implementations, the first plug and the second plug are magnetically coupled together.

In at least some implementations, the first plug and second plug are mating male and female components.

In at least some implementations, the second plug is at a first end of the second segment and the transmitter is at a second end of the second segment.

In at least some implementations, the first plug is at a first end of the first segment and a second end of the first segment is accessible from the exterior.

In at least some implementations, the body has an outer surface that defines the exterior wherein the transmitter is mounted on the outer surface.

In at least some implementations, the body includes a cover having an outer surface that defines at least part of the exterior and an inner surface that defines at least part of the interior and wherein the transmitter is closer to the inner surface than the outer surface.

In at least some implementations, a vehicle seat assembly comprises a headrest with a body having an exterior and an interior and a first mount. The vehicle seat assembly includes a vehicle seat with a second mount coupled to the first mount, a source cable communicated with a power supply at least partially within the vehicle seat and having an end accessible from the second mount, and a power cable at least partially within the interior. The power cable is connected to the source cable and the power cable has a transmitter that includes a magnetic connector. The magnetic connector adapted to be magnetically coupled to a device and the transmitter is adapted to provide electrical energy through the magnetic connector to provide electrical power to a device connected to the magnetic connector.

In at least some implementations, one of the first mount and the second mount includes an opening, and the other of the first mount and the second mount includes a post at least partially received within the opening.

In at least some implementations, the source cable is accessible from the first mount and the power cable is accessible from the second mount.

In at least some implementations, the body has an outer surface that defines the exterior wherein the transmitter is mounted on the outer surface.

In at least some implementations, the body includes a cover having an outer surface that defines at least part of the exterior and an inner surface that defines at least part of the interior and wherein the transmitter is closer to the inner surface than the outer surface.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
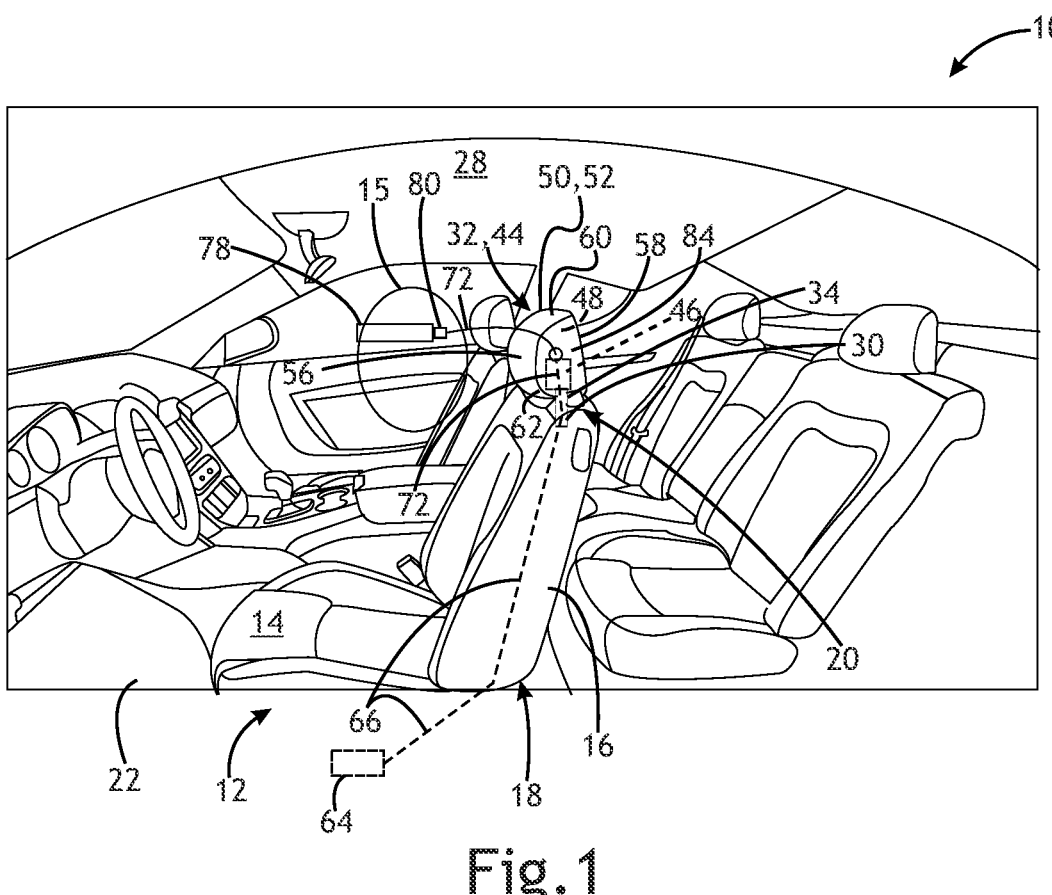
FIG. 1 is a perspective view of a passenger compartment of a vehicle.

Referring in more detail to the drawings, FIG. 1 shows an interior of a vehicle including a passenger compartment 10 having one or more seats 12. The seats 12 include a seat bottom 14 on which an occupant 15 sits, and a seat back 16 that extends vertically from a lower end 18 adjacent to the seat bottom 14 to an opposite upper end 20. The seat bottom 14 is mounted to the floor 22 of the passenger compartment 10 and has at least a top surface and back surface, wherein the top surface faces the roof 28 of the passenger compartment 10 and the back surface faces towards the rear of the passenger compartment 10. Both the interior of the seat bottom 14 and the interior of the seat back 16 may be configured to at least partially house a support structure, cushions, and wires or cables to power seat adjustment and seat heating or cooling devices. The seat back 16 may be pivotably mounted relative to the seat bottom 14 and includes a headrest mounting structure 30 by which a headrest assembly (hereafter just headrest) 32 is mounted to the seat back 16. In at least some implementations, the headrest mounting structure 30 may include one or more openings configured to interact with a mount 34 of a headrest 32 that is coupled to the upper end 20 of the seat back 16.

The mount 34 may extend from the headrest 32 and is configured to be coupled to the headrest mounting structure 30 of the seat back 16. The mount 34 may include one or more posts 34 configured to interact with the one or more openings 30 of the headrest mounting structure 30. The mount 34 and headrest mounting structure 30 are complimentary such that the one or more posts of one may be received in a like number of openings of the other. In at least some implementations, the mount 34 can be vertically adjusted to change the distance of the headrest 32 from the seat back 16.

The headrest 32 has a body 44 with an exterior and an interior, and the body 44 is mountable to a vehicle seat 12 with the mount 34. At least partially within the interior, the body 44 may have a support structure 46 that may be integral to the mount 34 such that the mount 34 and the support structure 46 are one piece, or the support structure and the mount 34 may be separate pieces coupled together. A cushion 48 comprising a foam or soft polymeric material may be mounted to or carried by the support structure 46, including a forward-facing portion between the support structure and a front surface of the headrest 32. The cushion 48 may be partially or entirely enclosed by a cover 50 made of a fabric, cloth, leather, vinyl or similar material such that the cushion is oriented between the cover 50 and the support structure. The cover 50 has an outer surface 52 defining the exterior of the body 44 and an inner surface defining the interior of the body 44 such that at least part of the support structure 46 and the cushion 48 are within the interior of the headrest 32. The exterior of the headrest 32 includes: a forward surface 56 that faces the front of the passenger compartment 10 and the head of an occupant 15 in the seat 12; a rearward surface 58 that faces towards the rear of the passenger compartment 10, opposite to the forward surface 56; an upper surface 60; and a bottom surface 62 that are vertically spaced apart such that the upper surface 60 faces the roof 28 of the passenger compartment 10 and the bottom surface 62 faces the upper end 20 of the seat back 16.

The vehicle includes a power supply 64 that serves as an electrical energy source for accessories or devices. The power supply 64 may be a battery, power generator such as an alternator or regenerative braking system, or other forms of energy storage and generation. The power supply 64 may include components located at various positions throughout the vehicle or passenger compartment 10 and capable of transmitting electrical power through conductors (e.g. wires) to locations throughout the vehicle or passenger compartment 10.

Figure 2:
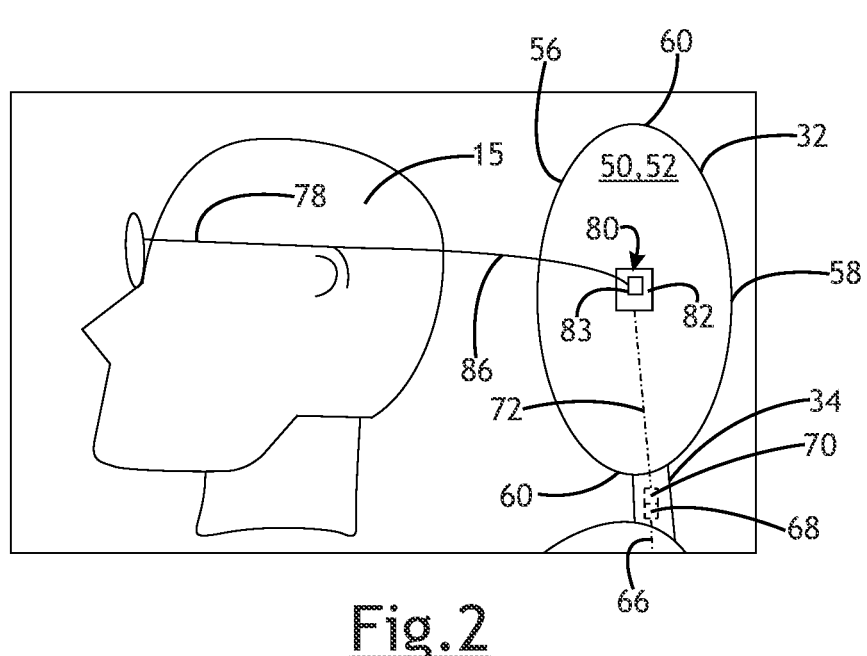
FIG. 2 is a diagrammatic view showing a headrest coupled to an electronic device worn on the head of a vehicle occupant.

A source cable 66 may be connected to the power supply 64 at a first end and extend to a second end, opposite to the first end, which may include an electrical connector 68 (shown in FIG. 2). The source cable 66 includes a conductor, e.g. a copper wire, capable of conducting electrical current from one location to another. The source cable 66 is configured to connect to and provide power to a headrest power assembly. In the embodiments shown in FIGS. 1-4, the source cable 66 originates at a tap or connection of the power supply 64 located in or adjacent to the floor 22 of the passenger compartment 10. From the power supply 64, the source cable 66 is routed through the interior of the seat bottom 14 and the interior of the seat back 16 to the headrest mounting structure 30 adjacent which the connector 68 may be accessible. The headrest power assembly includes a power cable 72 located at least partially within the interior of the headrest 32, is adapted to communicate with a power supply 64, and is connected at a first end by a connector 70 (FIG. 2) to the connector 68/second end of the source cable 66. In at least some implementations, at or near the headrest mounting structure 30, the source cable 66 connects to the power cable 72 such that at least a portion of either or both of the source cable 66 and the power cable 72 extends through the headrest mounting structure 30, for example, through a post or opening of the mount 34.

As shown in FIG. 2, to provide power to an electronic device 78 located outside the headrest 32, the power cable 72 is connected at a second end to a power transmitter 80 including a magnetic connector 82. The magnetic connector 82 has a magnet that has a magnetic field that enables coupling with a magnetic connector 83 of the electronic device 78. Via the magnetic connector 82, the power transmitter 80 wirelessly transmits or emits electrical energy to be received by the magnetic coupler 83 of the electronic device 78 which includes a receiver for the transmitted power. In this way, the electronic device 78 is capable of receiving electrical energy from the transmitter 80 and that energy received by the device 78 may be used to charge a battery within the device 78 or to power functions of the device 78.

In FIG. 2, an embodiment is shown wherein the power cable 72 is routed within the interior of the headrest 32 such that only the magnetic connector 82 is accessible from outside of the headrest 32. In this embodiment, the magnetic connector 82 is located on, and may be mounted/fixed to, the side 84 of headrest 32 along the outer surface 52 in between the forward and rearward surfaces 56, 58 such that the magnetic connector 82 is exposed to the passenger compartment 10. However, in other embodiments the magnetic connector 82 can be located elsewhere on the outer surface 52 as desired. Alternatively, the magnetic connector 82 may be positioned slightly recessed from the outer surface 52, slightly elevated from the outer surface 52, or beneath the outer surface 52 between the cushion and the cover 50 (e.g. behind the cover 50) such that the magnetic field of the transmitter 80/magnetic connector 82 can permeate through the cover 50. When located behind the cover 50, the coupler 83 of the electronic device 78 may be configured to couple to and receive power from the magnetic connector 82 through the cover 50.

The electronic device 78 may have an external cable 86 that extends from the electronic device 78 and terminates at the magnetic coupler 83 to transmit electrical energy from the magnetic connector 82 to the electronic device 78 (e.g. to a battery or other power storage device of the electronic device 78). The external cable 86 may be extendable or contractable such that moving the electronic device 78 about the passenger compartment 10 within a certain distance of the headrest 32 does not sever the physical and electrical connections between the magnetic connector 82 and the electronic device 78. In this way, the connection with the device 78 is flexible but if the electronic device 78 moves beyond the predetermined distance from the headrest 32, the external cable 86 stops extending and further movement causes the magnetic coupler 83 to disconnect from the magnetic connector 82 so the electronic device 78 is decoupled from the power supply. For example, the external cable 86 may include a coiled portion that extends and straightens out when the device 78 is moved away from the headrest 32, and when the power cable 72 is straight or taut, further extension is not possible and disconnection of the magnetic connector 82 from the magnetic coupler of the device 78 occurs.

Figure 3:
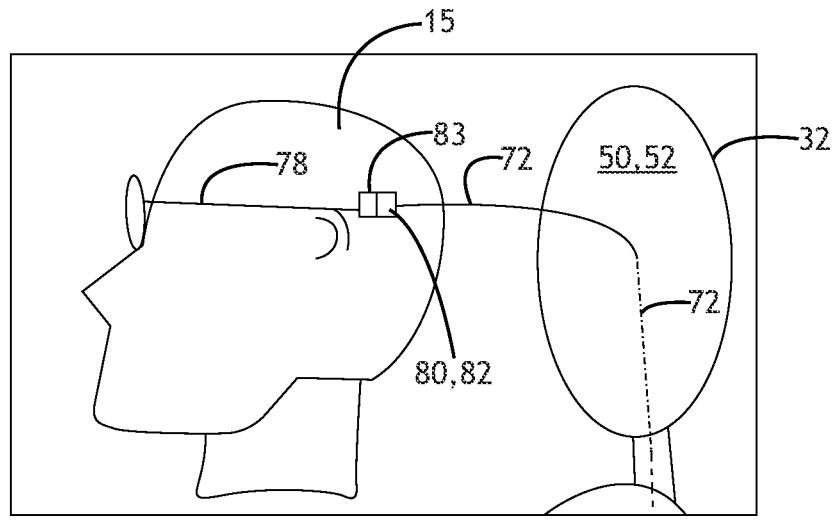
FIG. 3 is a view similar to FIG. 2 and showing a different electrical connection to the electronic device.

FIG. 3 illustrates an embodiment of the headrest power assembly in which the power cable 72 has a portion located within the interior of the headrest 32 and a portion that extends out of the headrest and is located outboard of the exterior of the headrest 32. In this embodiment, the transmitter 80/magnetic connector 82 is located at the end of the portion of the power cable 72 and outside of the headrest 32. The electronic device 78 may have a mating magnetic connector 83 that couples with the magnetic connector 82 to receive and transmit electrical energy from the magnetic connector 82 of the power cable 72 to the electronic device 78. The portion of the power cable 72 that is beyond the outer surface 52 may be extendable or contractable (e.g. coiled or otherwise) such that moving the electronic device 78 around and within a certain distance of the headrest 32 does not sever the physical and electrical connections between the magnetic connector 82 and the electronic device 78, but the magnetic connectors 82, 83 will automatically disconnect to prevent damage to either connector 82, 83 or the cable 72 or device 78.

Figure 4:
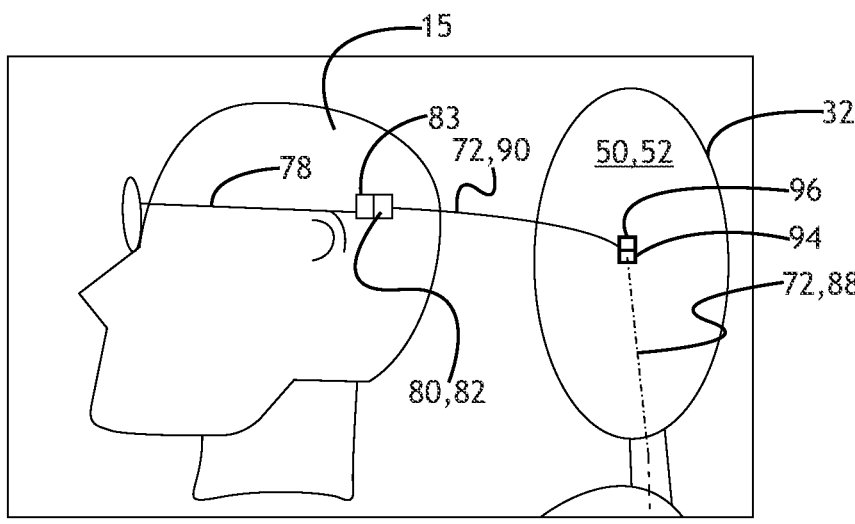
FIG. 4 is a view similar to FIG. 2 and showing a different electrical connection to the electronic device.

In FIG. 4, an embodiment of the headrest power assembly is shown wherein the power cable 72 contains a first segment 88 and a second segment 90 removably coupled together by mating electrical connectors, wherein the connectors include a first plug 94 and a second plug 96. The first plug 94 and second plug 96 may be mating male and female components creating a physical electrical connection between the first plug 94 and the second plug 96. Alternatively, the first plug 94 and the second plug 96 may be magnetically coupled together, utilizing induction to transfer electrical energy from the first segment 88 to the second segment 90. In this embodiment, the first plug 94 is at a second end of the first segment 88 and the second plug 96 is at a first end of the second segment 90. The first plug 94 may be fixed to or exposed from the cover 50 of the headrest 32 such that it is accessible from outside the outer surface 52, although the first plug 94 may be located elsewhere, as desired. For example, the first segment 88 could be partially beyond the outer surface 52 such that the first plug 94 is not mounted to the outer surface 52, but is accessible from the end of the first segment 88. Alternatively, the first plug 94 could be recessed from or beneath the outer surface 52.

In FIG. 4, the second plug 96 of the second segment 90 connects to the first plug 94 of the first segment 88, creating an electrical connection between the first segment 88 and the second segment 90. At an end of the second segment 90 opposite to the second plug 96, the second segment 90 has a transmitter 80/magnetic connector 82 as described herein and configured to couple to a magnetic coupler 83 or an electronic device 78 to provide power to the electronic device 78 or to charge the battery on the electronic device 78. Either the first segment 88, the second segment 90, or both 88, 90 may be extendable or contractable such that moving the electronic device 78 about the passenger compartment 10 within a certain distance of the headrest 32 does not sever the physical and electrical connections between the magnetic connector 82 and the electronic device 78.

In at least some implementations, the electronic device 78 is worn on or near the head of a vehicle occupant 15 located in the seat 12, and power is transmitted via the headrest power assembly to the electronic device 78. The electronic device 78 may include audio and/or video features, such as headphones or electronic glasses having a frame and lenses on which information may be projected or otherwise displayed. Such glasses are sometimes called smart glasses, virtual reality glasses or enhanced or augmented reality glasses. Such glasses may be used to provide information to a driver of the vehicle, such as current speed, fuel level, navigation route or instructions, alerts, and the like. Of course, other electronic devices may be used with the power assembly, including audio devices, portable massagers (e.g. a neck massaging device) and the like.

By providing electrical power to the electronic device 78 from the vehicle, a battery or other power storage device of the device 78 can be made smaller and lighter weight. This enables reduction in the size and/or the weight of the device 78 and can improve user comfort, especially when the device 78 is worn for longer periods of time. The flexible power cable 72 and/or external cable 86 can permit a desired range of motion of the device 78 relative to the headrest 32, and the magnetic coupling permits automatic decoupling of the device 78 without damaging the device 78 or power cable 72 or the connector 82. Further, the magnetic coupling facilitates easy coupling and decoupling of the device 78 to the vehicle power supply 64, without tight-fitting plug-type connections that can wear out and which might not disconnect easily/automatically as a user moves the device 78 to or beyond the predetermined limit.

In at least some implementations, a first mount may be coupled to the headrest 32 and a second mount may be coupled to the seat 12. One of the first mount and the second mount includes an opening, and the other of the first mount and the second mount includes a post at least partially received within the opening. The source cable 66 may be accessible from the first mount and the power cable 72 may be accessible from the second mount. In assembly, electrical connectors of the source cable 66 and power cable 72 may be connected and then fitted into a post 34, which may be hollow and include an opening or passage through which the cable 66 or 72 may be routed, or opening used to mount the headrest to the seat. In this way, the headrest can be disconnected from the source cable 66 when it is desired to remove the headrest from the seat (e.g. for repair or replacement).

What is claimed is:

1. A vehicle headrest assembly, comprising:

a body with an exterior and an interior, and a mount by which the body is mountable on a vehicle seat; and a power cable at least partially within the interior, adapted to communicate with a power supply, the power cable also having a transmitter that includes a magnetic connector 82 adapted to be magnetically coupled to a device and the transmitter is adapted to provide electrical energy through the magnetic connector to provide electrical power to a device connected to the magnetic connector, wherein the power cable comprises a first segment at least partially within the interior of the body and a second segment at least partially outside the interior of the body, and the first segment has a first plug and the second segment has a second plug and the first plug and the second plug are removably coupled together to electrically connect the first segment and the second segment.

2. The assembly of claim 1 wherein the mount includes a post by which the body is connectable to a vehicle seat wherein at least part of the power cable is received within the post.

3. The assembly of claim 2 wherein a first end of the power cable is accessible from an end of the post and a second end of the power cable is accessible from the exterior and a portion of the power cable between the first end of the power cable and the second end of the power cable is within the interior.

4. The assembly of claim 1 wherein the first plug and the second plug are magnetically coupled together.

5. The assembly of claim 1 wherein the first plug and second plug are mating male and female components.

6. The assembly of claim 1 wherein the second plug is at a first end of the second segment and the transmitter is at a second end of the second segment.

7. The assembly of claim 6 wherein the first plug is at a first end of the first segment and a second end of the first segment is accessible from the exterior.

8. The assembly of claim 1 wherein the body has an outer surface that defines the exterior wherein the transmitter is mounted on the outer surface.

9. The assembly of claim 1 wherein the body includes a cover having an outer surface that defines at least part of the exterior and an inner surface that defines at least part of the interior and wherein the transmitter is closer to the inner surface than the outer surface.

10. A vehicle seat assembly, comprising:

a headrest with a body having an exterior and an interior and a first mount;

a vehicle seat with a second mount coupled to the first mount;

a source cable communicated with a power supply at least partially within the vehicle seat and having an end accessible from the second mount; and a power cable at least partially within the interior, connected to the source cable, the power cable also having a transmitter that includes a magnetic connector adapted to be magnetically coupled to a device and the transmitter is adapted to provide electrical energy through the magnetic connector to provide electrical power to a device connected to the magnetic connector, wherein the power cable comprises a first segment at least partially within the interior of the body and a second segment at least partially outside the interior of the body, and wherein the first segment has a first plug and the second segment has a second plug and the first plug and the second plug are removably coupled together to electrically connect the first segment and the second segment.

11. The assembly of claim 10 wherein one of the first mount and the second mount includes an opening, and the other of the first mount and the second mount includes a post at least partially received within the opening.

12. The assembly of claim 11 wherein the source cable is accessible from the first mount and the power cable is accessible from the second mount.

13. The assembly of claim 10 wherein the first plug and the second plug are magnetically coupled together.

14. The assembly of claim 10 wherein the first plug and the second plug are male and female components.

15. The assembly of claim 10 wherein the body has an outer surface that defines the exterior wherein the transmitter is mounted on the outer surface.

16. The assembly of claim 10 wherein the body includes a cover having an outer surface that defines at least part of the exterior and an inner surface that defines at least part of the interior and wherein the transmitter is closer to the inner surface than the outer surface.

\* \* \* \* \*